US012577339B2

(12) United States Patent
Sohn et al.

(10) Patent No.: US 12,577,339 B2
(45) Date of Patent: Mar. 17, 2026

(54) FLUORINE-BASED POLYMER WITH LOW DIELECTRIC CONSTANT AND FLUORINE-BASED POLYMER COMPOSITION COMPRISING SAME

(71) Applicant: KOREA RESEARCH INSTITUTE OF CHEMICAL TECHNOLOGY, Yuseong-gu (KR)

(72) Inventors: Eun-Ho Sohn, Yuseong-gu (KR); Won Wook So, Yuseong-gu (KR); In Joon Park, Yuseong-gu (KR); Bong Jun Chang, Yuseong-gu (KR); Hong Suk Kang, Yuseong-gu (KR); Ju Hyeon Kim, Yuseong-gu (KR); Ji Hoon Baik, Yuseong-gu (KR); Sang Goo Lee, Yuseong-gu (KR); Hyeon Jun Heo, Yuseong-gu (KR); Shin Hong Yook, Yuseong-gu (KR); Dong Je Han, Yuseong-gu (KR); Ji Young Lee, Yuseong-gu (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 0 days.

(21) Appl. No.: 18/580,684

(22) PCT Filed: Jul. 4, 2022

(86) PCT No.: PCT/KR2022/009579

§ 371 (c)(1),
(2) Date: Jan. 19, 2024

(87) PCT Pub. No.: WO2023/003214

PCT Pub. Date: Jan. 26, 2023

(65) Prior Publication Data

US 2025/0084196 A1 Mar. 13, 2025

(30) Foreign Application Priority Data

Jul. 19, 2021 (KR) ........................ 10-2021-0094087

(51) Int. Cl.
*C08F 220/14* (2006.01)
*C08F 220/22* (2006.01)
*C08J 5/18* (2006.01)

(52) U.S. Cl.
CPC .......... *C08F 220/14* (2013.01); *C08F 220/22* (2013.01); *C08J 5/18* (2013.01);
(Continued)

(58) Field of Classification Search
CPC ...................................................... C08F 220/14
(Continued)

(56) References Cited

U.S. PATENT DOCUMENTS 4,742,140 A * 5/1988 Greenwood .......... C08F 220/22 526/245
2015/0240085 A1* 8/2015 Klein ........................ F03D 1/06 524/873
2020/0385563 A1* 12/2020 Sohn .................... C09D 133/16

FOREIGN PATENT DOCUMENTS

JP 2006063132 A 3/2006
JP 2012177111 A 9/2012
(Continued)

OTHER PUBLICATIONS

English Abstract and Machine Translation for Japanese Publication No. JP 2006-63132 A, published Mar. 9, 2006, 25 pgs.
(Continued)

*Primary Examiner* — Tahseen Khan
(74) *Attorney, Agent, or Firm* — Fredrikson & Byron, P.A.

(57) ABSTRACT

An aspect of the present invention is to provide a fluorine-based polymer showing a significantly low dielectric con-
(Continued)

stant of less than 1.8 and a fluorine-based polymer composition including the same. The fluorine-based polymer provided in an aspect of the present invention shows a very low dielectric constant, wherein the polymer is not only a pollution-reducing material generating no harmful substance, but may also be utilized as a coating material in various fields due to high adhesiveness. Furthermore, a polymer film employing the polymer as a material has a volume resistance of about $5.8\times10^{15}$ Ohmcm, showing an excellent resistance value as an insulating material.

12 Claims, 1 Drawing Sheet

(52) U.S. Cl.
CPC ....... *C08F 2800/10* (2013.01); *C08J 2333/12* (2013.01); *C08J 2333/16* (2013.01)

(58) Field of Classification Search
USPC .......................................................... 428/220
See application file for complete search history.

(56) References Cited

FOREIGN PATENT DOCUMENTS

| | | | | | |
|---|---|---|---|---|---|
| JP | 2013173840 | A | | 9/2013 | |
| KR | 1020150065775 | A | | 6/2015 | |
| KR | 1020170101626 | A | | 9/2017 | |
| KR | 2019078484 | A | * | 7/2019 | ............ B32B 27/08 |
| KR | 1020190078484 | A | | 7/2019 | |
| WO | WO-2015013279 | A1 | * | 1/2015 | ............. C08L 33/14 |

OTHER PUBLICATIONS

English Abstract and Machine Translation for Japanese Publication No. JP 2012-177111 A, published Sep. 13, 2012, 28 pgs.
English Abstract and Machine Translation for Japanese Publication No. JP 2013-173840 A, published Sep. 5, 2013, 8 pgs.
English Abstract and Machine Translation for Korean Publication No. KR 10-2015-0065775 A, published Jun. 15, 2015, 24 pgs.
English Abstract and Machine Translation for Korean Publication No. KR 10-2017-0101626 A, published Sep. 6, 2017, 7 pgs.
English Abstract and Machine Translation for Korean Publication No. KR 10-2019-0078484 A, published Jul. 4, 2019, 14 pgs.

* cited by examiner

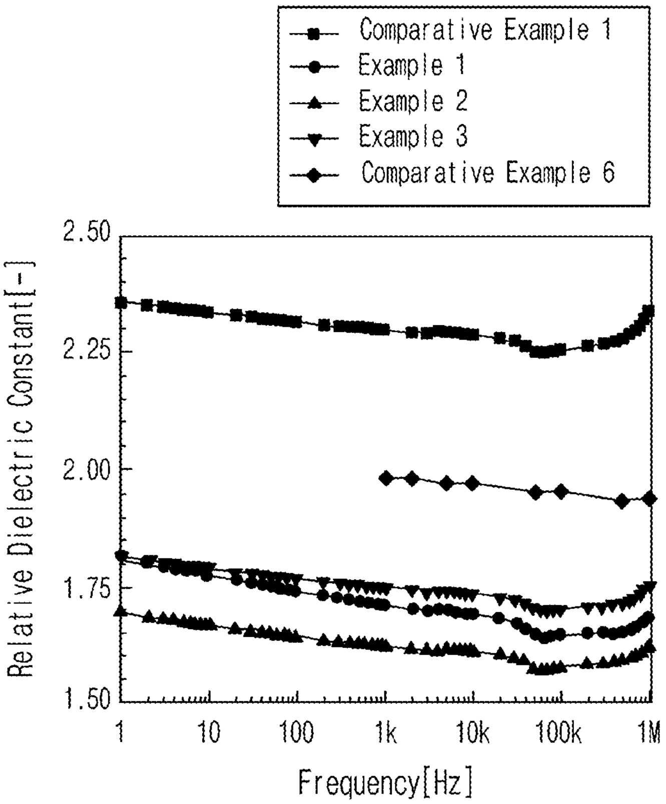
Comparative Example 1
Example 1
Example 2
Example 3
Comparative Example 6
2.50
2.25
2.00
1.75
1.50
Relative Dielectric Constant[-]
1
10
100
1k
10k
100k
1M
Frequency[Hz]

FLUORINE-BASED POLYMER WITH LOW DIELECTRIC CONSTANT AND FLUORINE-BASED POLYMER COMPOSITION COMPRISING SAME

RELATED APPLICATIONS

This application is a U.S. National Stage application filed under 35 U.S.C. § 371 of International Application No. PCT/KR2022/009579 filed Jul. 4, 2022, which claims the benefit of Korean Application No. KR 10-2021-0094087, filed Jul. 19, 2021. Both of these applications are incorporated herein by reference.

TECHNICAL FIELD

The present disclosure relates to a fluorine-based polymer having a low dielectric constant and a fluorine-based polymer composition including the same.

BACKGROUND ART

Fluorine has a high electron density, a small atomic radius after a hydrogen atom, and a strong electronegativity, thereby forming a solid carbon-fluorine bond. Due to these characteristics of fluorine, monomers containing a perfluorinated alkyl group exhibit a superhydrophobicity having a critical surface tension of 6-8 dynes/cm, and the surface energy thereof is also very low to repel both water and oil. Accordingly, fluorine-based compounds have excellent chemical stability, heat resistance, weather resistance, non-stickiness, low surface energy, water repellency, and low refractive index, and thus have gradually been of wider use although provided with a relatively high price tag.

Currently, fluorine-based functional materials exhibit excellent performance involving contamination resistance, weather resistance, heat resistance, and optical properties, which is not achievable via other materials, and thus are widely used as a core material for next-generation technologies in the high-tech industries such as optical communications, optoelectronics, semiconductors, automobiles, and computers. In particular, research on the fluorine-based functional materials has been actively conducted as interest in antipollution coating of various paints and coating agents has increased in the areas of household appliances, architecture, shipbuilding, and civil engineering, which require traditional antipollution surface properties, including anti-pollution coating of the front outermost layer of liquid crystal displays or the frames of fine displays. In this context, Japanese Patent Publication JP 2012-177111 A has disclosed a fluorinated copolymer based on acrylate for high solid content coating.

Fluoropolymers are substances provided with properties such as low surface energy, water repellency, lubricity, and low refractive index, along with excellent heat resistance, chemical resistance, and weather resistance, and have been widely used throughout the industry including household products.

Meanwhile, the dielectric constant (s is a measure of the amount of charges polarized when an external electric field is applied, and is one of the critical physical properties of insulating materials used in electronic devices. In general, the dielectric constant ε is reported as a relative value ($\varepsilon_r$) to the dielectric constant of vacuum ($\varepsilon_0$~$8.8542*10^{-12}$ F/m), and is represented by Formula, $\varepsilon=\varepsilon_r*\varepsilon_0$. The dielectric constant ($\varepsilon_r$) of typical insulating materials is reported in polyimide (dielectric constant of 2.8-3.2), fluorinated polyimide (2.5-2.9), polyethylene (dielectric constant of 2.3-2.7), PMMA (dielectric constant of 3.0-4.5), TFE (dielectric constant of 2.0-2.2), $SiO_2$ (dielectric constant of 3.9-4.5), and Teflon AF (dielectric constant of 2.1).

DISCLOSURE OF THE INVENTION

Technical Problem

One object of the present invention is to provide a fluorine-based polymer showing a significantly low dielectric constant of less than 1.8 and a fluorine-based polymer composition including the same.

Technical Solution

In order to achieve the objects, an aspect of the present invention provides a polymer fluorine-based represented by Formula 1 below.

<Formula 1>

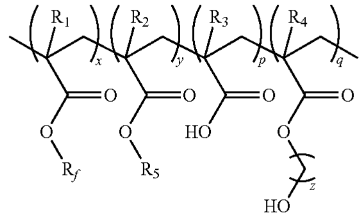

(In Formula 1 above, $R_f$ is a $C_{3-20}$ fluorinated branched alkyl, containing 2 to 4 of at least one of $CF_2$ and $CF_3$;

$R_{1-4}$ are each independently hydrogen (H), methyl ($CH_3$), or halogen group;

$R_5$ is $C_{1-20}$ straight alkyl or $C_{3-20}$ branched alkyl;

with respect to the molar ratio of x+y+p+q=100, x is 5-35, y is 35-65, p is 1-20, and q is 10-30; and z is an integer of 1-5.)

Another aspect of the present invention also provides a fluorine-based polymer composition including the fluorine-based polymer represented by Formula 1 above and an organic solvent.

Yet another aspect of the present invention also provides a fluorine-based polymer film including the fluorine-based polymer represented by Formula 1 above.

Yet another aspect of the present invention also provides a method for preparing a fluorine-based polymer film, the method including:

dissolving the fluorine-based polymer in an organic solvent to prepare a fluorine-based polymer composition; and applying the fluorine-based polymer composition onto a substrate and drying the resulting product to form a fluorine-based polymer film.

Advantageous Effects

A fluorine-based polymer provided in an aspect of the present invention shows a very low dielectric constant, and the polymer is not a pollution-reducing material generating no harmful substance, but may also be utilized as a coating material in various fields due to high adhesiveness. Furthermore, a polymer film employing the polymer as a material has a volume resistance of about $5.8\times10^{15}$ Ohm cm, showing an excellent resistance value as an insulating material.

BRIEF DESCRIPTION OF THE DRAWINGS

FIG. 1 shows dielectric constants of fluorine-based polymer films prepared using fluorine-based polymers prepared in Examples 1 to 3 and Comparative Examples 1 and 6.

BEST MODE FOR CARRYING OUT THE INVENTION

An aspect of the present invention provides a fluorine-based polymer represented by Formula 1 below.

<Formula 1>

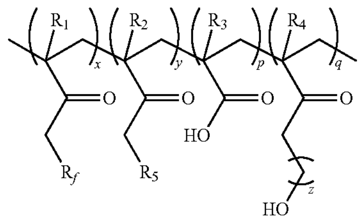

(In Formula 1 above, $R_f$ is a $C_{3-20}$ fluorinated branched alkyl, containing 2 to 4 of at least one of $CF_2$ and $CF_3$;

$R_{1-4}$ are each independently hydrogen (H), methyl ($CH_3$), or halogen group;

$R_5$ is $C_{1-20}$ straight alkyl or $C_{3-20}$ branched alkyl;

with respect to the molar ratio of x+y+p+q=100, x is 5-35, y is 35-65, p is 1-20, and q is 10-30; and z is an integer of 1-5.)

Hereinafter, the fluorine-based polymer provided in an aspect of the present invention will be described in detail.

The fluorine-based polymer provided in an aspect of the present invention may be represented by Formula 1 above.

In the fluorine-based polymer represented by Formula 1 above, $R_f$ may be a $C_{3-20}$ fluorinated branched alkyl, of which the number of fluorocarbons may be 2 to 5, preferably 2 to 4, more preferably 2 to 3, most preferably 2. As a specific example, the $R_F$ is a $C_3$ fluorinated branched alkyl, and preferably contains two $CF_3$'s.

In addition, for example, in the fluorine-based polymer represented by Formula 1 above, $R_1$, $R_2$, $R_3$, and $R_4$ may each independently be hydrogen (H), methyl ($CH_3$), or halogen group. The halogen group may be fluorine (F) or chlorine (Cl). Furthermore, in the fluorine-based polymer represented by Formula 1 above, $R_1$, $R_2$, $R_3$, and $R_4$ are preferably methyl.

Furthermore, for example, in the fluorine-based polymer represented by Formula 1 above, $R_5$ may be represented by $-(CH_2)_c-CH_3$.

In this case, c may be an integer of 0-15, 1-10, or 1-5, but is not limited thereto.

In in addition, the fluorine-based polymer represented by Formula 1 above, x is 5-35, y is 35-65, p is 1-20, and q is 10-30, with respect to the molar ratio of x+y+p+q=100.

The x may be 5-35, 7-33, 8-32, and 10-30, preferably 12-28, more preferably 13-27, preferably 15-25, more preferably 17-23, most preferably 18-22.

In addition, y may be 35-65, 37-63, 38-62, and 40-60, preferably 42-58, more preferably 43-57, preferably 45-55, more preferably 47-53, most preferably 48-52.

Furthermore, the p may be 1-20, preferably 5-15, more preferably 7-13, preferably 8-12, even more preferably 9-11.

In addition, the q may be 10-30, preferably 15-25, more preferably 17-23, preferably 18-22, even more preferably 19-21.

Furthermore, x: (p+q) is preferably 1:1-3, more preferably 1:1.2-2.0, preferably 1:1.3-1.7, most preferably 1:1.4-1.6. A very low dielectric constant may be provided through the constitution in the above range.

In addition, as example, the fluorine-based an polymer provided in an aspect of the present invention may be represented by Formula 2 below.

<Formula 2>

(In Formula 2 above, $R_f$ is a $C_{3-20}$ fluorinated branched alkyl, containing 2 to 4 of at least one of $CF_2$ and $CF_3$;

$R_1$, $R_2'$, $R_2''$, $R_3$, and $R_4$ are each independently hydrogen (H), methyl ($CH_3$), or halogen group;

$R_5'$ is $C_{2-20}$ straight alkyl or $C_{3-20}$ branched alkyl;

with respect to the molar ratio of x+y'+y"+p+q=100, x is 5-35, y' is 5-15, y" is 25-55, p is 1-20, and q is 10-30; and z is an integer of 1-5.)

In the fluorine-based polymer represented by Formula 2 above, $R_f$ may be a $C_{3-20}$ fluorinated branched alkyl, of which the number of fluorocarbons may be 2 to 5, preferably 2 to 4, more preferably 2 to 3, most preferably 2. As a specific example, the $R_F$ is a $C_3$ fluorinated branched alkyl, and preferably contains two $CF_3$'s.

In addition, for example, in the fluorine-based polymer represented by Formula 2 above, $R_1$, $R_2$, $R_3$, and $R_4$ may each independently be hydrogen (H), methyl ($CH_3$), or halogen group. The halogen group may be fluorine (F) or chlorine (Cl). Furthermore, in the fluorine-based polymer represented by Formula 2 above, $R_1$, $R_2$, $R_3$, and $R_4$ are preferably methyl.

Furthermore, for example, in the fluorine-based polymer represented by Formula 2 above, $R_5$ may be represented by $-(CH_2)_c-CH_3$.

In this case, c may be an integer of 0-15, 1-10, or 1-5, but is not limited thereto.

In addition, in the fluorine-based polymer represented by Formula 12 above, x is 5-35, y' is 5-15, y" is 25-55, p is 1-20, and q is 10-30, with respect to the molar ratio of x+y'+y"+p+q=100.

The x may be 5-35, 7-33, 8-32, and 10-30, preferably 12-28, more preferably 13-27, preferably 15-25, more preferably 17-23, most preferably 18-22.

In addition, y' is preferably 5-15, more preferably 7-13, preferably 8-12, even more preferably 9-11.

Furthermore, y" may be 25-55, 27-53, 28-52, and 30-50, and 32-48, preferably 33-47, more preferably 35-45, preferably 37-43, more preferably 38-42.

In addition, the p may be 1-20, preferably 5-15, more preferably 7-13, preferably 8-12, even more preferably 9-11.

Furthermore, the q may be 10-30, preferably 15-25, more preferably 17-23, preferably 18-22, even more preferably 19-21.

In addition, x: (p+q) is preferably 1:1-3, more preferably 1:1.2-2.0, preferably 1:1.3-1.7, most preferably 1:1.4-1.6. A very low dielectric constant may be provided through the constitution in the above range.

For example, the fluorine-based polymer represented by Formula 1 or Formula 2 above more preferably has a number average molecular weight of 70,000 to 100,000. When the number average molecular weight of the fluorine-based polymer is less than 70,000, the thermal and mechanical strength of the polymer may be reduced, and when the number average molecular weight of the fluorine-based polymer is greater than 100,000, the solubility in an organic solvent may rapidly decline.

Furthermore, the fluorine-based polymer represented by Formula 1 or Formula 2 provided in an aspect of the present invention is highly beneficial in the manufacturing process because the polymer may be dissolved in generally known organic solvents, unlike typical fluorine-based polymers. As an example of the organic solvents, any general organic solvent such as at least one selected from the group consisting of tetrahydrofuran (THF), 2-butanol (MEK), methyl isobutyl ketone (MIBK), and propylene glycol methyl ether (PGMEA) may be used without any limitation. However, in this case, an organic solvent capable of dissolving both monomers before reactions and polymers after reactions well is preferable for use.

Furthermore, the fluorine-based polymer provided in an aspect of the present invention preferably has a dielectric constant of less than 1.8, more preferably less than 1.7, most preferably 1.2 to 1.7.

Another aspect of the present invention also provides a fluorine-based polymer composition including the fluorine-based polymer represented by Formula 1 or Formula 2 above and an organic solvent.

Hereinafter, the fluorine-based polymer composition provided in another of the present invention will be described in detail.

The fluorine-based polymer is as described above, and the fluorine-based polymer according to the present invention may obtain a significantly low dielectric constant along with low surface energy and high light transmittance, and thus may be applied to various applications requiring these properties. As a composition for such applications, the composition has high solubility in organic solvents.

The organic solvent may be at least one selected from the group consisting of tetrahydrofuran (THF), 2-butanol (MEK), methyl isobutyl ketone (MIBK), and propylene glycol methyl ether (PGMEA), but is not limited thereto, and an organic solvent capable of dissolving both monomers before reactions and polymers after reactions well is preferable for use.

The fluorine-based polymer composition preferably further includes a curing agent containing an isocyanate group. The synthesized fluorine-based polymer may have stronger chemical and mechanical durability with the inclusion of a curing agent. However, when the curing agent reacts with the polymer at room temperature, viscosity ever-changes from the moment of mixing, and this causes degradation in workability and storage. In order to prevent the limitations, a curing agent composed of a compound in which a reactive group of the curing agent dissociates at a specific temperature is preferably used, and in this regard, preferably, a curing agent of the HDI trimer series containing an isocyanate group is further included.

When the fluorine-based polymer composition further includes a curing agent containing an isocyanate group, the curing agent is preferably contained in a molar ratio of 1.1 to 1.5 with respect to the total moles of a hydroxyl group of the fluorine-based polymer. When the amount is less than 1.1, the mechanical and chemical properties are not sufficient due to degradation in curing, and when the amount is greater than 1.5, surface energy increases due to a reduction in content ratio of fluorine methacrylate with respect to the total amount of the composition.

Yet another aspect of the present invention also provides a fluorine-based polymer film including the fluorine-based polymer represented by Formula 1 or Formula 2 above.

Hereinafter, the fluorine-based polymer film provided in another aspect of the present invention will be described in detail.

The fluorine-based polymer is as described above, and the fluorine-based polymer according to the present invention may obtain a significantly low dielectric constant along with low surface energy and high light transmittance, and thus may be applied to various applications requiring these properties. As a composition for such applications, the composition has high solubility in organic solvents.

The fluorine-based polymer film preferably further includes a curing agent containing an isocyanate group. The synthesized fluorine-based polymer may have stronger chemical and mechanical durability with the inclusion of a curing agent. However, when the curing agent reacts with the polymer at room temperature, viscosity ever-changes from the moment of mixing, and this causes degradation in workability and storage. In order to prevent the limitations, a curing agent composed of a compound in which a reactive group of the curing agent dissociates at a specific temperature is preferably used, and in this regard, preferably, a curing agent of the HDI trimer series containing an isocyanate group is further included.

The fluorine-based polymer film preferably has a thickness of 1 μm to 800 μm, 10 μm to 500 μm, 15 μm to 300 μm, and 50 μm to 200 μm.

The fluorine-based polymer film has a dielectric constant of preferably less than 1.8, more preferably less than 1.7, most preferably 1.2 to 1.7.

Furthermore, the fluorine-based polymer film may have a volume resistance of $1.0\times10^{15}$ Ohm·cm to $1.0\times10^{16}$ Ohm·cm, $2.0\times10^{15}$ Ohm·cm to $9.0\times10^{15}$ Ohm·cm, $3.0\times10^{15}$ Ohm·cm to $8.0\times10^{15}$ Ohm·cm, and $4.0\times10^{15}$ Ohm·cm to $7.0\times10^{15}$ Ohm·cm.

Yet another aspect of the present invention also provides a method for preparing a fluorine-based polymer film, the method including:

dissolving the fluorine-based polymer in an organic solvent to prepare a fluorine-based polymer composition; and applying the fluorine-based polymer composition onto a substrate and drying the resulting product to form a fluorine-based polymer film.

Hereinafter, the method for preparing a fluorine-based polymer film provided in another aspect of the present invention is described in detail step by step.

First, the method for preparing a fluorine-based polymer film provided in another aspect of the present invention includes dissolving the fluorine-based polymer in an organic solvent to prepare a fluorine-based polymer composition.

The fluorine-based polymer according to the present invention has excellent solubility in an organic solvent, and may thus be easily dissolved in an organic solvent to prepare a polymer solution.

For example, the organic solvent may be at least one selected from the group consisting of tetrahydrofuran (THE), 2-butanol (MEK), methyl isobutyl ketone (MIBK), and propylene glycol methyl ether (PGMEA), but is not limited thereto.

Then, the method for preparing a fluorine-based polymer film provided in another aspect of the present invention includes applying the fluorine-based polymer composition onto a substrate and drying the resulting product to form a fluorine-based polymer film.

As a specific example, the applying may be performed through methods such as spin coating, dip coating, roll coating, and spray coating.

Meanwhile, the method for preparing a fluorine-based polymer film preferably further includes mixing a curing agent containing an isocyanate group with the fluorine-based polymer composition prepared above.

When a curing agent is further included in the process of preparing a fluorine-based polymer film, stronger chemical and mechanical durability may be provided. However, when the curing agent reacts with the polymer at room temperature, viscosity ever-changes from the moment of mixing, and this causes degradation in workability and storage. In order to prevent the limitations, a curing agent composed of a compound in which a reactive group of the curing agent dissociates at a specific temperature is preferably used, and in this regard, preferably, a curing agent of the HDI trimer series containing an isocyanate group is further included.

In the preparation method of the present invention, when mixing a curing agent containing an isocyanate group is further included, the curing agent is preferably mixed at a molar ratio of 1.1 to 1.5 with respect to the total moles of a hydroxy group of the fluorine-based polymer. When the amount is less than 1.1, the mechanical and chemical properties are not sufficient due to degradation in curing, and when the amount is greater than 1.5, surface energy increases due to a reduction in content ratio of fluorine methacrylate with respect to the total amount of the composition.

MODE FOR CARRYING OUT THE INVENTION

Hereinafter, the present invention will be described in detail through Examples and Experimental Examples below.

However, the following Examples and Experimental Examples are only for illustrating the present invention, and the contents of the present invention are not limited thereto.

<Example 1> Preparation of Fluorine-Based Polymer-1

10 mol % of hexafluoroisopropyl methacrylate (HxFIPMA), 10 mol % of stearyl methacrylate (SMA), 50 mol % of methyl metahcrylate (MMA), 10 mol % of methacrylic acid (MAA), and 20 mol % of hydroxyethyl methacrylate (HEMA) were added and copolymerized. Monomers were dissolved in a tetrahydrofuran (THE) solvent at an amount of 40 wt % to 50 wt %, and the temperature was raised to 60° C. to 70° C. in a nitrogen atmosphere, and then an azobis isobutyro nitrile (AIBN) initiator or a benzoyl peroxide (BPO) initiator was added and subjected to a reaction for 8 to 12 hours. Thereafter, in order to remove remaining radicals, the temperature was raised to 80° C. to perform reflux on the resulting product, and then the reaction was terminated while cooling the resulting product to room temperature to prepare a fluorine-based copolymer, that is, a fluorine-based polymer.

<Example 2> Preparation of Fluorine-Based Polymer-2

A fluorine-based polymer was prepared in the same manner as in Example 1, except that 20 mol % of hexafluoroisopropyl methacrylate (HxFIPMA), 10 mol % of stearyl methacrylate (SMA), 40 mol % of methyl metahcrylate (MMA), 10 mol % of methacrylic acid (MAA), and 20 mol % of hydroxyethyl methacrylate (HEMA) were added from Example 1.

<Example 3> Preparation of Fluorine-Based Polymer-3

A fluorine-based polymer was prepared in the manner as in Example 1, except that 30 mol % of hexafluoroisopropyl methacrylate (HxFIPMA), 10 mol % of stearyl methacrylate (SMA), 30 mol % of methyl metahcrylate (MMA), 10 mol % of methacrylic acid (MAA), and 20 mol % of hydroxyethyl methacrylate (HEMA) were added from Example 1.

<Comparative Example 1> Preparation of Fluorine-Based Polymer-4

A fluorine-based polymer was prepared in the same manner as in Example 1, except that HxFIPMA was excluded, and 10 mol % of stearyl methacrylate (SMA), 60 mol % of methyl metahcrylate (MMA), 10 mol % of methacrylic acid (MAA), and 20 mol % of hydroxyethyl methacrylate (HEMA) were added from Example 1.

<Comparative Example 2> Preparation of Fluorine-Based Polymer-5

A fluorine-based polymer was prepared in the same manner as in Example 2, except that HxFIPMA was excluded, and 20 mol % of octafluoropentyl methacrylate (OFPMA), 10 mol % of stearyl methacrylate (SMA), 40 mol % of methyl methacrylate (MMA), 10 mol % of methacrylic acid (MAA), and 20 mol % of hydroxyethyl methacrylate (HEMA) were added from Example 2.

<Comparative Example 3> Preparation of Fluorine-Based Polymer-6

A fluorine-based polymer was prepared in the same manner as in Example 2, except that HxFIPMA was excluded, and 20 mol % of hexafluorobutyl methacrylate (HxFBMA), 10 mol % of stearyl methacrylate (SMA), 40 mol % of methyl methacrylate (MMA), 10 mol % of methacrylic acid (MAA), and 20 mol % of hydroxyethyl methacrylate (HEMA) were added from Example 2.

<Comparative Example 4> Preparation of Fluorine-Based Polymer-7

A fluorine-based polymer was prepared in the same manner as in Example 2, except that HxFIPMA was excluded, and 20 mol % of dodecafluoroheptyl methacrylate (DDFHMA), 10 mol % of stearyl methacrylate (SMA), 40 mol % of methyl methacrylate (MMA), 10 mol % of methacrylic acid (MAA), and 20 mol % of hydroxyethyl methacrylate (HEMA) were added from Example 2.

<Comparative Example 5> Preparation of Fluorine-Based Polymer-8

A fluorine-based polymer was prepared in the same manner as in Example 2, except that HxFIPMA was excluded, and 20 mol % of tridecafluoro-n-octyl methacrylate (TDFOMA), 10 mol % of stearyl methacrylate (SMA), 40 mol % of methyl methacrylate (MMA), 10 mol % of methacrylic acid (MAA), and 20 mol % of hydroxyethyl methacrylate (HEMA) were added from Example 2.

<Comparative Example 6> Preparation of Fluorine-Based Polymer-9

A fluorine-based polymer was prepared in the same manner as in Example 1, except that 40 mol % of hexafluoroisopropyl methacrylate (HxFIPMA), 10 mol % of stearyl methacrylate (SMA), 20 mol % of methyl metahcrylate (MMA), 10 mol % of methacrylic acid (MAA), and 20 mol % of hydroxyethyl methacrylate (HEMA) were added from Example 1.

<Experimental Example 1> Analysis of Electrical Properties of Fluorine-Based Polymer Film Fluorine-based polymer films were formed using the fluorine-based polymers synthesized in Examples and Comparative Examples above through a curing agent.

The prepared fluorine-based polymer was dissolved in a mixed solvent in which MEK and PGMEA were mixed in a volume ratio of 9:1 to prepare a polymer solution, and an HDI-based curing agent in an amount such that the ratio of a hydroxy group in the polymer and a functional group of the curing agent was 100:110 was introduced to prepare a polymer composition.

In the polymer composition, a film was formed on a flat substrate though bar coating or spin coating, and then cured through heat treatment in an oven for 5 hours at 145° C. or higher, which is the dissociation temperature of the curing agent, to prepare a fluorine-based polymer film.

Specifically, when bar coating is performed to prepare a relatively thick polymer film, a 40 wt % polymer solution is dropped onto a silicon wafer specimen, a well-leveled bar is placed at a height of 1 mm from the specimen surface to spread the solution on the specimen by moving the bar at a constant speed. Thereafter, the solvent was heated at the above temperature and time range for evaporation, and subjected to a cross-linking reaction to prepare a film having a thickness of about 150-250 microns.

In addition, when spin coating is performed to prepare a relatively thin and uniform polymer film, a 40 wt % solution is applied uniformly on a silicon wafer specimen through spin coating g at 2000 rpm for 1 minute, and the specimen is heated at the above temperature and time range to evaporate the solvent and cause a cross-linking reaction. A film having a uniform thickness is obtained by peeling off the film obtained right after the curing from the specimen. Under the above conditions, a film having a thickness of about 20-30 microns is obtained, and a film having a thinner thickness may be obtained by making changes in solution concentration, viscosity, and spin coating rotation speed.

1) Review of Dielectric Constant of Known Materials

Dielectric constant (ε is a measure of the amount of charges polarized when an external electric field is applied. This is one of the critical physical properties of insulating materials used in electronic devices. In general, the dielectric constant (ε) is reported as a relative value ($\varepsilon_r$) to the dielectric constant of vacuum ($\varepsilon_0$~8.8542*$10^{-12}$ F/m), and is represented by Formula, $\varepsilon=\varepsilon_r*\varepsilon_0$. Dielectric constants ($\varepsilon_r$) of typical insulating materials are shown in Table 1.

TABLE 1

| Material | Dielectric constant $\varepsilon_r$ | Material | Dielectric constant $\varepsilon_r$ |
|---|---|---|---|
| Water | 78 | PVDF | 6-12 |
| Polyimide | 2.8-3.2 | PMMA | 3.0-4.5 |
| Fluorinated polyimide | 2.5-2.9 | PTFE | 2.0-2.2 |
| Polyethylene | 2.3-2.7 | $SiO_2$ | 3.9-4.5 |
| Teflon AF | 2.1 | Air | 1.02 |

2) Analysis of Dielectric Constant According to Fluorine Terminal of Fluorine-Based Polymer Film Using the fluorine-based polymers prepared in Example 2 and Comparative Examples 2 to 5, as described above, a relatively thick (150-200 micron thick) fluorine-based polymer film was prepared through bar coating to measure dielectric constant, and the results are shown in Table 2 below.

TABLE 2

| | Fluorine monomer | Thickness (μm) | Dielectric constant (1 kHz) | Dielectric constant (1 MHz) |
|---|---|---|---|---|
| Example 2 | HxFIPMA | 180 | 1.71 | 1.68 |
| Comparative Example 2 | OFPMA | 170 | 2.48 | 2.38 |
| Comparative Example 3 | HxFBMA | 205 | 2.34 | 2.28 |
| Comparative Example 4 | DDFHMA | 180 | 2.10 | 2.04 |
| Comparative Example 5 | TDFOMA | 230 | 2.17 | 2.10 |

As shown in Table 2, it is seen that all copolymers containing fluorine-based monomers tested in the present invention have a dielectric constant of 2.5 or less, and thus have lower values than most insulating materials (see Table 1) as well as the most common methacrylate, PMMA having a dielectric constant of 3.0. Furthermore, it is seen that the polymer film using the fluorine-based polymer of Example 2 presented in the present invention has a significantly low dielectric constant of 1.68.

3) Analysis of Dielectric Constant According to Copolymerization Ratio of Fluorine-Based Acrylic Monomer of Fluorine-Based Polymer Film Using the fluorine-based polymers prepared in Examples 1 to 3 and Comparative Examples 1 and 6, as described above, a relatively thin and uniform fluorine-based polymer film (having a thickness of 20-25 microns) was prepared through spin coating to measure dielectric constant, and the results are shown in FIG. 1.

As shown in FIG. 1, it is seen that the ratio of HxFIPMA, a fluorine-based monomer, has a significant effect on the dielectric constant. Comparative Example 1 containing no HxFIPMA is shown to have the highest dielectric constant (2.3 at 1 kHz), and Example 1 containing a small amount of HxFIPMA is shown to have a sharply reduced dielectric constant (1.73 at 1 kHz). It is seen that Example 2 has the lowest dielectric constant (1.62 at 1 kHz), and Example 3 having a greater content has a low dielectric constant (1.75 at 1 kHz), but Comparative Example 6 has a dielectric constant close to 2.

4) Analysis of Volume Resistance of Fluorine-Based Polymer

In order for polymers to be used as insulating materials, the polymers are required to have a certain level of volume resistance.

Resistivity was measured using the fluorine-based polymer of Example 2 through an MCP-HT450 high resistivity meter from Mitsubishi. The applied voltage was 1000 V, and the measured temperature was 23° C. Resistance was measured by measuring a total of 6 points and taking an average value. This is shown in Table 3 below.

TABLE 3

| | Point 1 | Point 2 | Point 3 | Point 4 | Point 5 | Point 7 | Average |
|---|---|---|---|---|---|---|---|
| Volume resistance [Ωcm] | $7.71\times^{15}$ | $7.87\times^{15}$ | $6.39\times^{15}$ | $3.83\times^{15}$ | $4.61\times^{15}$ | $4.23\times^{15}$ | $5.8\times^{15}$ |

Most insulating plastics have a volume resistance of $10^{14}$ Ωcm to $10^{17}$ Ωcm, and the fluorine-based polymer of Example 2 shown in the present invention has a volume resistance of $5.8\times10^{15}$ Ωcm, indicating that the polymer is suitable for use as an insulating material. As such, the fluorine-based polymer provided according to an aspect of the present invention shows a very low dielectric constant, and the polymer is not only a pollution-reducing material generating no harmful substance, but may also be utilized as a coating material in various fields due to high adhesiveness. Furthermore, a polymer film employing the polymer as a material has a volume resistance of about $5.8\times10^{15}$ Ωcm, showing an excellent resistance value as an insulating material.

In addition, when the number of fluorocarbons contained in a fluorine side chain is 5 or more, PFOA-based hazardous substances may be generated during decomposition, and this may cause environmental issues. Furthermore, solubility in organic solvents also rapidly decline. A copolymer developed in the present invention uses a fluorine monomer (HxFIPMA) having a short branched fluorine side chain, and thus is not involved in the issues described above.

The invention claimed is:

1. A fluorine-based polymer represented by Formula 1 below:

<Formula 1>

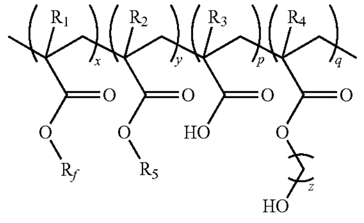

(wherein in Formula 1 above, $R_f$ is a $C_{3-20}$ fluorinated branched alkyl, containing 2 to 4 of at least one of $CF_2$ and $CF_3$;

$R_{1-4}$ are each independently hydrogen (H), methyl ($CH_3$), or halogen group;

$R_5$ is $C_{1-20}$ straight alkyl or $C_{3-20}$ branched alkyl;

with respect to molar ratio of x+y+p+q=100, x is 5-35, y is 35-65, p is 1-20, and q is 10-30; and z is an integer of 1-5).

2. The fluorine-based polymer according to claim 1, wherein the fluorine-based polymer has a number average molecular weight of 70,000 to 100,000.

3. The fluorine-based polymer according to claim 1, wherein the fluorine-based polymer has a dielectric constant of less than 1.8.

4. A fluorine-based polymer composition comprising a fluorine-based polymer represented by Formula 1 below and an organic solvent:

<Formula 1>

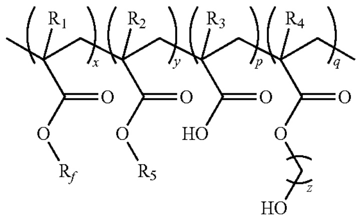

(wherein in Formula 1 above, $R_f$ is a $C_{3-20}$ fluorinated branched alkyl, containing 2 to 4 of at least one of $CF_2$ and $CF_3$;

$R_{1-4}$ are each independently hydrogen (H), methyl ($CH_3$), or halogen group;

$R_5$ is $C_{1-20}$ straight alkyl or $C_{3-20}$ branched alkyl;

with respect to molar ratio of x+y+p+q=100, x is 5-35, y is 35-65, p is 1-20, and q is 10-30; and z is an integer of 1-5).

5. The fluorine-based polymer composition according to claim 4, wherein the organic solvent is at least one selected from a group consisting of tetrahydrofuran (THF), 2-butanol (MEK), methyl isobutyl ketone (MIBK), and propylene glycol methyl ether (PGMEA).

6. The fluorine-based polymer composition according to claim 4, wherein the fluorine-based polymer composition further comprises a curing agent containing an isocyanate group.

7. The fluorine-based polymer composition according to claim 6, wherein the curing agent containing an isocyanate group is contained in a molar ratio of 1.1 to 1.5 with respect to the total moles of a hydroxy group of the fluorine-based polymer.

8. A fluorine-based polymer film comprising a fluorine-based polymer represented by Formula 1 below:

<Formula 1>

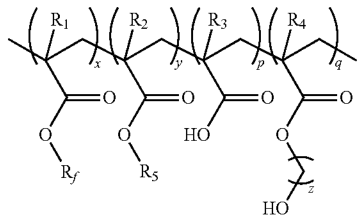

(wherein in Formula 1 above, $R_f$ is a $C_{3-20}$ fluorinated branched alkyl, containing 2 to 4 of at least one of $CF_2$ and $CF_3$;

$R_{1-4}$ are each independently hydrogen (H), methyl ($CH_3$), or halogen group;

$R_5$ is $C_{1-20}$ straight alkyl or $C_{3-20}$ branched alkyl;

with respect to molar ratio of x+y+p+q=100, x is 5-35, y is 35-65, p is 1-20, and q is 10-30; and z is an integer of 1-5).

9. The fluorine-based polymer film according to claim 8, wherein the fluorine-based polymer film has a thickness 1 μm to 800 μm.

10. The fluorine-based polymer film according to claim 8, wherein the fluorine-based polymer film has a dielectric constant of less than 1.8.

11. A method for preparing a fluorine-based polymer film, the method comprising:

dissolving the fluorine-based polymer of claim 1 in an organic solvent to prepare a fluorine-based polymer composition; and applying the fluorine-based polymer composition onto a substrate and drying applied composition to form a fluorine-based polymer film.

12. The method according to claim 11, wherein the method for preparing a fluorine-based polymer film further comprises mixing a curing agent containing an isocyanate group with the prepared fluorine-based polymer composition.

* * * * *